(12) United States Patent
Brewer et al.

(10) Patent No.: US 7,835,295 B2
(45) Date of Patent: Nov. 16, 2010

(54) INTERFACE MODULE WITH POWER OVER ETHERNET FUNCTION

(75) Inventors: John Paul Brewer, Chaska, MN (US); Eric Darrell Rotvold, Inver Grove Heights, MN (US); Kelly Michael Orth, Apple Valley, MN (US); Robert John Karschnia, Chaska, MN (US); Philip Gordon Ostby, Cologne, MN (US); Donald Robert Lattimer, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 1070 days.

(21) Appl. No.: 11/184,730

(22) Filed: Jul. 19, 2005

(65) Prior Publication Data

US 2007/0019560 A1  Jan. 25, 2007

(51) Int. Cl.
*H04L 12/28* (2006.01)
*G06F 11/28* (2006.01)
(52) U.S. Cl. .................. 370/252; 370/395.52; 709/223
(58) Field of Classification Search .................. 370/419, 370/437, 468, 493, 535, 395.5–395.52, 251–412; 710/11, 16, 105, 305–311; 709/223–253; 713/300; 700/1–89, 37, 295; 702/61; 455/574, 455/522, 127.1, 572
See application file for complete search history.

(56) References Cited

U.S. PATENT DOCUMENTS 4,122,719 A   10/1978   Carlson et al. ................. 72/342

(Continued)

FOREIGN PATENT DOCUMENTS

CN         1578455          2/2005

(Continued)

OTHER PUBLICATIONS

"Power over Ethernet", aus Wikipedia, der freien Enzyklopadie, file://C:\DOCUME~\mm22318\LOCALS~1\Temp\Q2TZF6Z2. htm, Nov. 14, 2006, 2 pages.

(Continued)

*Primary Examiner*—Afsar M. Qureshi
(74) *Attorney, Agent, or Firm*—Christopher R. Christenson; Westman, Champlin & Kelly, P.A.

(57) ABSTRACT

An interface module for use in a process monitoring and control system has an Ethernet port, a controller, and at least one segment I/O module. The Ethernet port is adapted to send and receive signals in an Ethernet protocol over a cable comprising a plurality of wires and to receive a voltage potential from at least one pair of the plurality of wires. The controller is coupled to the Ethernet port and powered from the received voltage potential. The at least one segment I/O module is coupled to the controller and is adapted to couple to an associated field device segment with at least one attached field device. The at least one segment I/O module is adapted to interact with the at least one attached field device on the associated field device segment.

4 Claims, 4 Drawing Sheets

U.S. PATENT DOCUMENTS

| | | | |
|---|---|---|---|
| 4,243,931 A | 1/1981 | dela Cruz | 323/302 |
| 4,399,824 A | 8/1983 | Davidson | 128/736 |
| 4,413,314 A | 11/1983 | Slater et al. | 341/20 |
| 4,571,689 A | 2/1986 | Hildebrand et al. | 364/481 |
| 4,665,393 A | 5/1987 | Wilder et al. | 340/683 |
| 4,678,937 A | 7/1987 | Price | 307/317 |
| 4,736,367 A | 4/1988 | Wroblewski et al. | 370/449 |
| 4,910,658 A | 3/1990 | Dudash et al. | 340/3.54 |
| 4,936,690 A | 6/1990 | Goetzinger | 374/181 |
| 4,939,753 A | 7/1990 | Olson | 375/107 |
| 4,988,990 A | 1/1991 | Warrior | 340/25.5 |
| 5,051,867 A | 9/1991 | Burgher et al. | 361/688 |
| 5,122,794 A | 6/1992 | Warrior | 340/825.2 |
| 5,269,311 A | 12/1993 | Kirchner et al. | 128/672 |
| 5,307,346 A | 4/1994 | Fieldhouse | 370/254 |
| 5,333,114 A | 7/1994 | Warrior et al. | 700/67 |
| 5,347,843 A | 9/1994 | Orr et al. | 73/3 |
| 5,426,697 A | 6/1995 | McGrane | 379/398 |
| 5,442,639 A | 8/1995 | Crowder et al. | 371/20.1 |
| 5,495,769 A | 3/1996 | Broden et al. | 73/718 |
| 5,551,053 A | 8/1996 | Nadolski et al. | 395/829 |
| 5,573,032 A | 11/1996 | Lenz et al. | 137/486 |
| 5,623,605 A | 4/1997 | Keshav et al. | 395/200.17 |
| 5,637,802 A | 6/1997 | Frick et al. | 73/724 |
| 5,669,713 A | 9/1997 | Schwartz et al. | 374/1 |
| 5,672,975 A | 9/1997 | Kielb et al. | 324/644 |
| 5,680,109 A | 10/1997 | Lowe et al. | 340/608 |
| 5,691,896 A | 11/1997 | Zou | 364/157 |
| 5,700,090 A | 12/1997 | Eryurek | 374/210 |
| 5,703,575 A | 12/1997 | Kirkpatrick | 340/870.17 |
| 5,706,007 A | 1/1998 | Fragnito et al. | 341/155 |
| 5,708,585 A | 1/1998 | Kushion | 364/431.061 |
| 5,710,708 A | 1/1998 | Wiegand | 364/470.1 |
| 5,713,668 A | 2/1998 | Lunghofer et al. | 374/179 |
| 5,719,378 A | 2/1998 | Jackson, Jr. et al. | 219/497 |
| 5,737,543 A | 4/1998 | Gavin et al. | 710/105 |
| 5,741,074 A | 4/1998 | Wang et al. | 374/185 |
| 5,742,845 A | 4/1998 | Wagner | 395/831 |
| 5,752,008 A | 5/1998 | Bowling | 395/500 |
| 5,761,208 A | 6/1998 | Maramatsu | 370/532 |
| 5,764,891 A | 6/1998 | Warrior | 710/72 |
| 5,801,689 A | 9/1998 | Huntsman | 345/329 |
| 5,805,442 A | 9/1998 | Crater et al. | 700/9 |
| 5,825,664 A | 10/1998 | Warrior et al. | 364/550 |
| 5,829,876 A | 11/1998 | Schwartz et al. | 374/1 |
| 5,848,383 A | 12/1998 | Yuuns | 702/102 |
| 5,876,122 A | 3/1999 | Eryurek | 374/183 |
| 5,923,557 A | 7/1999 | Eidson | 700/129 |
| 5,926,778 A | 7/1999 | Pöppel | 702/130 |
| 5,936,514 A | 8/1999 | Anderson | 323/234 |
| 5,960,214 A | 9/1999 | Sharpe et al. | 710/15 |
| 5,970,430 A | 10/1999 | Burns et al. | 702/122 |
| 5,980,078 A | 11/1999 | Krivoshein et al. | 700/1 |
| 5,994,998 A | 11/1999 | Fisher et al. | 375/258 |
| 6,014,612 A | 1/2000 | Larson et al. | 700/1 |
| 6,016,523 A | 1/2000 | Zimmerman et al. | 710/63 |
| 6,026,352 A | 2/2000 | Burns et al. | 700/1 |
| 6,035,240 A | 3/2000 | Moorehead et al. | 700/2 |
| 6,045,260 A | 4/2000 | Schwartz et al. | 374/183 |
| 6,047,220 A | 4/2000 | Eryurek | 700/10 |
| 6,047,222 A | 4/2000 | Burns et al. | 700/79 |
| 6,052,655 A | 4/2000 | Kobayashi et al. | 702/184 |
| 6,076,171 A | 6/2000 | Kawata | 713/501 |
| 6,088,665 A | 7/2000 | Burns et al. | 702/188 |
| 6,094,600 A | 7/2000 | Sharpe et al. | 700/19 |
| 6,104,875 A | 8/2000 | Gallagher et al. | 717/168 |
| 6,140,911 A | 10/2000 | Fisher et al. | 375/258 |
| 6,192,281 B1 | 2/2001 | Brown et al. | 700/2 |
| 6,195,591 B1 | 2/2001 | Nixon et al. | 700/83 |
| 6,233,626 B1 | 5/2001 | Swales et al. | 710/11 |
| 6,260,004 B1 | 7/2001 | Hays et al. | 702/183 |
| 6,263,487 B1 | 7/2001 | Stripf et al. | 717/1 |
| 6,298,377 B1 | 10/2001 | Hartikainen et al. | 709/223 |
| 6,337,856 B1 | 1/2002 | Schanhals et al. | 370/352 |
| 6,360,277 B1 | 3/2002 | Ruckley et al. | 709/250 |
| 6,370,448 B1 | 4/2002 | Eryurek | 700/282 |
| 6,377,859 B1 | 4/2002 | Brown et al. | 700/79 |
| 6,535,983 B1 | 3/2003 | McCormack et al. | 713/310 |
| 6,574,515 B1 | 6/2003 | Kirkpatrick et al. | 700/19 |
| 6,611,775 B1 | 8/2003 | Coursolle et al. | 702/65 |
| 6,640,308 B1 * | 10/2003 | Keyghobad et al. | 713/300 |
| 6,711,446 B2 | 3/2004 | Kirkpatrick et al. | 700/19 |
| 6,757,725 B1 * | 6/2004 | Frantz et al. | 709/223 |
| 6,780,047 B1 | 8/2004 | Laity et al. | 439/501 |
| 6,788,980 B1 | 9/2004 | Johnson | 700/1 |
| 6,813,525 B2 | 11/2004 | Reid et al. | 700/11 |
| 6,859,755 B2 | 2/2005 | Eryurek et al. | 702/183 |
| 6,907,383 B2 | 6/2005 | Eryurek et al. | 702/183 |
| 6,961,624 B2 | 11/2005 | Kirkpatrick et al. | 700/270 |
| 6,970,003 B2 | 11/2005 | Rome et al. | 324/718 |
| 7,016,741 B2 | 3/2006 | Arntson | 700/19 |
| 7,020,532 B2 | 3/2006 | Johnson et al. | |
| 7,046,983 B2 | 5/2006 | Elkayam et al. | 455/402 |
| 2002/0195308 A1 | 12/2002 | Eryurek et al. | |
| 2004/0158334 A1 | 8/2004 | Kirkpatrick et al. | 700/27 |
| 2005/0130605 A1 | 6/2005 | Karschnia et al. | 455/90.3 |
| 2005/0288799 A1 | 12/2005 | Brewer et al. | 700/1 |
| 2006/0069455 A1 | 3/2006 | Longsdorf et al. | 700/45 |
| 2006/0122739 A1 | 6/2006 | Fandrey et al. | 700/300 |
| 2007/0019560 A1 | 1/2007 | Brewer et al. | 370/252 |
| 2007/0057783 A1 | 3/2007 | Reller | 340/538 |

FOREIGN PATENT DOCUMENTS

| | | |
|---|---|---|
| DE | 32 13 866 A1 | 4/1982 |
| DE | 40 08 560 A1 | 3/1990 |
| DE | 43 43 747 | 6/1994 |
| DE | 296 00 609 U1 | 3/1997 |
| DE | 197 04 694 A1 | 8/1997 |
| DE | 297 20 492 U1 | 2/1998 |
| DE | 19930660 A1 | 7/1999 |
| DE | 299 17 651 U1 | 12/2000 |
| EP | 0 601 344 A1 | 6/1994 |
| EP | 0 666 631 A2 | 1/1995 |
| EP | 0 782 297 | 2/1997 |
| EP | 0 825 506 A2 | 7/1997 |
| EP | 0 838 768 A2 | 9/1997 |
| EP | 0 807 804 A2 | 11/1997 |
| EP | 0 710 904 B1 | 10/1998 |
| EP | 1058093 A1 | 5/1999 |
| EP | 0 964 325 | 12/1999 |
| FR | 2 302 514 | 9/1976 |
| GB | 2 310 346 | 8/1997 |
| GB | 2 329 039 | 3/1999 |
| JP | 52-108194 | 9/1977 |
| JP | 3-212799 | 9/1991 |
| JP | 07162345 A | 6/1995 |
| JP | 07225530 | 8/1995 |
| JP | 08247076 | 9/1996 |
| JP | 2712625 | 10/1997 |
| JP | 2712701 | 10/1997 |
| WO | WO 96/02106 | 1/1996 |
| WO | WO 96/12993 | 5/1996 |
| WO | WO 98/06024 | 2/1998 |
| WO | WO 98/13677 | 4/1998 |
| WO | WO 98/14848 | 4/1998 |
| WO | WO 98/14852 | 4/1998 |
| WO | WO 98/29785 | 7/1998 |
| WO | WO 00/64099 | 10/2000 |

| WO | WO 00/70531 | 11/2000 |

OTHER PUBLICATIONS

Notification of Transmittal of the International Search Report and the Written Opinion o fthe International Searching Authority, or the Declaration, PCT/US2006/023942, filed Jul. 20, 2006.
Office Action from the European Patent Office in connection with corresponding application No. 06787883.5, dated Feb. 11, 2009.
Office Action from the U.S. Patent Office in connection with corresponding U.S. Appl. No. 11/489,931, dated Dec. 30, 2008.
"Notification of Transmittal of the International Search Report and the Written Opinion of the International Searching Authority, or the Declaration", PCT/US2006/028065, filed Jul. 19, 2006.
Office communication from the EPO for Application No. 06788153. 2-1239 filed Jun. 18, 2008; 9 pages.
"IEEE802.3af Power Over Ethernet: A Radical New Technology," wwww.PowerOverEthernet.com, pp. 1-10.
"Traditional Temperature Monitoring Applications," http://www.rosemount.com/products/temperature/m848arc.html#mounts.
"The Rosemount 3420 Fieldbus Interface Module allows Fieldbus Process Monitoring in Any Plant!" http://www.rosemount.com/products/accessories/m3420.html.
"A Revolution in Industrial Networking?" http://www.industrialnetworking.co.uk/mag/v9-3/f_poe.html.
Harry Forbes, ARC Insights, "Ethernet Devices Power Up," Insight #2002-46M, Oct. 9, 2002.
"Power Over Ethernet Specification Approved IEEE 802.3af Gives Hope to Device-Level Ethernet," http://www.manufacturing.net/ctl/article/CA318961?text=poe&spacedesc=news.
"Article: Powered Ethernet Spells Out Change For Field Devices," http://ethernet.industrial-networking.com/articles/i17fielddevices.asp.
"Fieldbus Interface Module," Emerson Process Management, Product Data Sheet, Jul. 2004.
"POE—Power Over Ethernet," http://www.altair.org/labnotes_POE.html.
Article: "New FieldConnex™Fieldbus Power Hub Provides Multiple Power Supplies Fieldbus Devices via Digital Data Lines", http://www.am.pepperl-fuchs.com/news/news.asp.
Article: "ISIHART™—Distributed HART Multiplexer", http://www.fint.no/fint_products_hart_mux.html.
Communication for European patent application 06 773 602.5, dated May 26, 2009.
Official Action for Russian patent application 2008106473, dated May 26, 2009.
First examination report from Chinese patent application 200680026507.8, filed Jul. 19, 2006.
"IEEE802.3af Power Over Ethernet: A Radical New Technology," wwww.PowerOverEthernet.com, pp. 1-10, Apr. 11, 2003.
"Traditional Temperature Monitoring Applications," http://www.rosemount.com/products/temperature/m848arc.html#mounts, 2003.
"The Rosemount 3420 Fieldbus Interface Module allows Fieldbus Process Monitoring in ANY Plant!" http://www.rosemount.com/products/accessories/m3420.html, 2003.
"A revolution in Industrial Networking?" http://www.industrialnetworking.co.uk/mag/v9-3/f_poe.html.
Harry Forbes, ARC Insights, "Ehernet Devices Power Up," Insight #2002-46M, Oct. 9, 2002.
"Power Over Ethernet Specification Approved IEEE 802.3af Gives Hope to Divce-Level Ethernet," http://ww.manufacturing.net/ctl/article/CA318961?text=poe&spacedesc=news, Sep. 2003.
"Article: Powered Ethernet Spells Out Change For Field Devices," Apr. 2004 http://ethernet.industiral-networking,com/articles/i17fielddevices.asp.
"Fieldbus Interface Module," Emerson Process Managment, Product Data Sheet, Jul. 2004.
"POE - Power Over Ethernet," http://www.altair.org/labnotes_POE.html, Nov. 2004.
Article: New FieldConnex™ Fieldbus Power Hub Provices Multiple Power Supplies Fieldbus Devices vi8a Digital Data Lintes, http://www.am.pepperl-fuchs.com/news/news.asp., 2004.
Article: "ISIHART™- Distributed HART Multiplexer", Aug. 2004 http://www.fint.no/fint_products_hart_mux.html.
"SPC4 Siemens PROFIBUS Controller", Jul. 1995, pp. 1, 61, 82, 83.
"Applying Internet Management Standards to Fieldbus Systems", by M. Knizak et al,. IEEE, 1997, pp. 309-315.
"Profibus Specification", Mar. 1998, pp. 1, 2, 885-902.
"Smart Sensor Networks of the Future", by J. Warrior, Sensors Magazine, Mar. 1997, pp. 1-7.
"Architectural Issues Related to Ethernet TCP/IP Connectivity to LonWorks", by D. Gaw et al., 1997, pp. 1-9.
"Vegapuls 64 FV/64UV 64 FV Ex 0, TIB Technical Information Operation Instructions", 1993, pp. 1-43.
"Einsatz von Java—Anwendungen zum Bedienen und Beobachten", by Prof. Feldmann et al., 1997, pp. 199-205.
"Written Opinion" PCT/US98/21339, Aug. 1999.
"International Preliminary Examination Report", PCT/US98/21339, Jan. 2000.
European Communiction, EP Application No. 98952204.6, Aug. 2000.
European Communication, EP Application No. 98952201.6, May 2001.
European Communication, EP Application No. 98952201.6, Apr. 2002.
European Communication of Notices of Opposition, EP Application No. 98952201.6, May 2001.
"Notice of Opposition to a European Patent", EP Application No. 98952201.6, Endress + Hauser, Jun. 23, 2004.
"Notice of Opposition to a European Patent", EP Application No. 98952201.6, VEGA Grieshaber KG, Jun. 24, 2004.
"Letter from Patent/Opponent" in EP Application No. 98952201.6, dated May 23, 2005.
Ethernet-TCP/IP, 1998, 6 pages.
"Fieldbus Support For Process Analysis" by, Blevins et al., Fisher-Rosemount Systems, Inc., 1995, pp. 121-128.
"Fieldbus Technical Overview Understanding FOUNDATION™ fieldbus technology", Fisher-Rosemount, 1998, pp. 1-23.
"Hypertext Transfer Protocol—HTTP/1.0" by, Berners-Lee et al., MIT/LCS, May 1996, pp. 1-54.
"Infranets, Intranets, and the Internet" by, Pradip Madan, Echelon Corp, Sensors, Mar. 1997, pp. 46-50.
"Internet Protocol Darpa Internet Program Protocol Specification" by, Information Sciences Institute, University of Southern California, RFC 791, Sep. 1981, pp. 1-43.
"Introduction to Emit", emWare, Inc., 1997, pp. 1-22.
"Introduction to the Internet Protocols" by, Charles L. Hedrick, Computer Science Facilities Group, Rutgers University, Oct. 3, 1988, pp. 1-97.
"Is There A Future For Ethernet in Industrial Control?", Miclot et al., Plant Engineering, Oct. 1988, pp. 44-46, 48, 50.
LFM/SIMA Internet Remote Diagnostics Research Project Summary Report, Stanford University, Jan. 23, 1997, pp. 1-6.
"Managing Devices with the Web" by, Howard et al., Byte, Sep. 1997, pp. 45-64.
"PC Software Gets Its Edge From Windows, Components, and the Internet", Wayne Labs, I&CS, Mar. 1997, pp. 23-32.
Proceedings Sensor Expo, Aneheim, California, Produced by Expocon Managemnet Associates, Inc., Apr. 1996, pp. 9-21.
Proceedings Sensor Expo, Boston, Massachuttes, Produced by Expocon Management Associates, Inc., May 1997, pp. 1-416.
"Smart Sensor Network of the Future" by, Jay Warrior, Sensors, Mar. 1997, pp. 40-45.
"The Embedded Web Site" by, John R. Hines, IEEE Spectrum, Sep. 1996, p. 23.
"Transmission Control Protocol: Darpa Internet Program Protocol Specification" Information Sciences Institute, Sep. 1981, pp. 1-78.
"emWare's Releases EMIT 3.0, Allowing Manufacturers to Internet and Network Enable Devices Royalty Free," 3 pages, PR Newswire (Nov. 4, 1998).
Warrior, J., "The IEEE P1451.1 Object Model Network Independent Interfaces for Sensors and Actuators," pp. 1-14, Rosemount Inc. (1997).

Warrior, J., "The Collision Between the Web and Plant Floor Automation," 6Th. WWW Conference Workshop on Embedded Web Technology, Santa Clara, CA (Apr. 7, 1997).
"Internal Statistical Quality Control for Quality Monitoring Instruments", by P. Girling et al., *ISA*, 15 pgs., 1999.
"Statistical Process Control (Practice Guide Series Book)", *Instrument Society of America*, 1995, pp. 1-58 and 169-204.
"Time-Frequency Analysis of Transient Pressure Signals for a Mechanical Heart Valve Cavitation Study," *ASAIO Journal*, by Alex A. Yu et al., vol. 44, No. 5, pp. M475-M479, (Sep.-Oct. 1998).
"Caviation in Pumps, Pipes and Valves," *Process Engineering*, by Dr. Ronald Young, pp. 47 and 49 (Jan. 1990).
"Quantification of Heart Valve Cavitation Based on High Fidelity Pressure Measurements," *Advances in Bioengineering 1994*, by Laura A. Garrison et al., BED—vol. 28, pp. 297-298 (Nov. 6-11, 1994).
"Monitoring and Diagnosis of Cavitation in Pumps and Valves Using the Wigner Distribution," *Hydroaccoustic Facilities, Instrumentation, and Experimental Techniques*, NCA—vol. 10, pp. 31-36 (1991).
"Developing Predictive Models for Cavitation Erosion," *Codes and Standards in A Global Environment*, PVP—vol. 259, pp. 189-192 (1993).
"Self-Diagnosing Intelligent Motors: A Key Enabler for Next Generation Manufacturing System," by Fred M. Discenzo et al., pp. 3/1-3/4 (1999).
"A Microcomputer-Based Instrument for Applications in Platinum Resistance Thermomety," by H. Rosemary Taylor and Hector A. Navarro, Journal of Physics E. Scientific Instrument, vol. 16, No. 11, pp. 1100-1104 (1983).
"Experience in Using Estelle for the Specification and Verification of a Fieldbus Protocol: FIP," by Barretto et al., Computer Networking, pp. 295-304 (1990).
"Computer Simulation of H1 Field Bus Transmission," by Utsumi et al., Advances in Instrumentation and Control, vol. 46, Part 2, pp. 1815-1827 (1991).
"Progress in Fieldbus Developments for Measuring and Control Application," by A. Schwaier, Sensor and Acuators, pp. 115-119 (1991).
"Ein Emulationssystem zur Leistungsanalyse von Feldbussystemen, Teil 1," by R. Hoyer, pp. 335-336 (1991).
"Simulatore Integrato: Controllo su bus di campo," by Barabino et al., Automazione e Strumentazione, pp. 85-91 (Oct. 1993).
"Ein Modulares, verteiltes Diagnose-Expertensystem für die Fehlerdiagnose in lokalen Netzen," by Jürgen M. Schröder, pp. 557-565 (1990).
"Fault Diagnosis of Fieldbus Systems," by Jürgen Quade, pp. 577-581 (Oct. 1992).
"Ziele und Anwendungen von Feldbussystemen," by T. Pfeifer et al., pp. 549-557 (Oct. 1987).
"PROFIBUS-Infrastrukturmaßnahmen," by Tilo Pfeifer et al., pp. 416-419 (Aug. 1991).
"Simulation des Zeitverhaltens von Feldbussystemen," by O. Schnelle, pp. 440-442 (1991).
"Feldbusnetz für Automatisierungssysteme mit intelligenten Funktionseinheiten," by W. Kriesel et al., pp. 486-489 (1987).
"Bus de campo para la inteconexión del proceso con sistemas digitales de control," Tecnología, pp. 141-147 (1990).
"Dezentrale Installation mit Echtzeit-Feldbus," Netzwerke, Jg. Nr.3 v. 14.3, 4 pages. (1990).
"Process Measurement and Analysis," by Liptak et al., Instrument Engineers' Handbook, Third Edition, pp. 528-530, (1995).
"Improving Dynamic Performance of Temperature Sensors With Fuzzy Control Techniques," by Wang Lei et al., pp. 872-873 (1992).
"Microsoft Press Computer Dictionary" 2nd Edition, 1994, Microsoft Press. p. 156.
"A TCP\IP Tutorial" by, Socolofsky et al., Spider Systems Limited, Jan. 1991 pp. 1-23.
"Approval Standards For Explosionproof Electrical Equipment General Requirements", Factory Mutual Research, Cl. No. 3615, Mar. 1989, pp. 1-34.
"Approval Standard Intrinsically Safe Apparatus and Associated Apparatus For Use In Class I, II, and III, Division 1 Hazardous (Classified) Locations", Factory Mutual Research, Cl. No. 3610, Oct. 1988, pp. 1-70.
"Automation On-line" by, Phillips et al., Plant Services, Jul. 1997, pp. 41-45.
"Climb to New Heights by Controlling your PLCs Over the Internet" by, Phillips et al., Intech, Aug. 1998, pp. 50-51.
"Ethernet emerges as viable, inexpensive fieldbus", Paul G. Schreier, Personal Engineering, Dec. 1997, p. 23-29.
"Ethernet Rules Closed-loop System" by, Eidson et al., Intech, Jun. 1998, pp. 39-42.
"Fieldbus Standard for Use in Industrial Control Systems Part 2: Physical Layer Specification and Service Definition", ISA-S50.02-1992, pp. 1-93.
"Fieldbus Standard for Use in Industrial Control Systems Part 3: Data Link Service Definition", ISA-S50.02-1997, Part 3, Aug. 1997, pp. 1-159.
Fieldbus Standard for Use in Industrial Control Systems Part 4: Data Link Protocol Specification, ISA-S50.02-1997, Part 4, Aug. 1997, pp. 1-148.
Second Official Action for Russian patent application No. 2008106473, dated Oct. 6, 2009.
International Search Report and Written Opinion from application No. PCT/US2006/028429, filed Jul. 20, 2006.
D5000 Series Users Manual, 23 pages, revised Jan. 1, 1998.
"ACE pc," Arcom Control Systems, 1 page dated Feb. 23, 2000, downloaded from http://ww.arcom.co.uk/products/iep/systems/ace/default.htm.
"Smart Transmitter (HART Protocol) Interface Prducts" 1770 Communication Products, 2 pages dated Apr. 26, 1999, downloaded from http://www.ab.com/catalogs/html/b112/io/smart.html.
"Smart Head and Rail Mount Temperature Transmitters," Models 644H and 644R, Fisher-Rosemount Managing the Process Better, pp. 27-53 (1998).
"Smart Temperature Transmitter," Models 3144 and 3244MV, Fisher-Rosemount Managing the Process Better, pp. 19-36 (1998).
Instruction Manual FDO-BI-Ex12.PA, German language document, and apparent English equivalent Part No.: 107591, Jan. 24, 2001.
Babb, M., "Looking Around for More Work To Do," Control Engineering International, vol. 43, No. 14, pp. 59-60, 62 (Oct. 1996).
Universal temperature multiplexer for Foundation Fieldbus, Universal converter, analogue, F2DO-TI-Ex8.FF, 2003.
Valve Coupler for Foundation Fieldbus, Manual FDO-VC-Ex4.FF, Nov. 22, 2000.
PROFIBUS-PA Sensor Interface Field Box, 2002 IS Catalog, 2002.
PROFIBUS-PA Valve Coupler Filed Box, 2002 IS Catalog, 2002.
EC-Type Examination Certificate for FDO-VC-Ex4.Pa, dated Dec. 18, 1998 (German language document and apparent English translation).
Supplement to EC-Type Examination Certificate for FDO-VC-Ex.Pa, dated Sep. 18, 2000 (German language document and apparent English translation).
Supplement to EC-Type Examination Certificate for FDO-VC-Ex.Pa, dated Sep. 21, 2000 (German language document and apparent English translation).
First Amendment to EC-Type Examination Certificate for FDO-VC-Ex.Pa, dated Dec. 22, 2000 (German language document and apparent English translation).
"Model 848T Eight Input Temperature Transmitter with FOUNDATION." Fieldbus, Product Data Sheet 00813-0100-4697, Mar. 2003.
Office Action from Chinese patent application No. 01809359.0, dated Apr. 23, 2004.
Second Examination Report for Chinese patent application No. 2006800265078, dated Sep. 2009.
First Office Action for Chinese patent application No. 200680025970.0, dated Aug. 21, 2009.
First Office Action for Chinese patent application no. 200680026376.3, dated Aug. 28, 2009.
"The Study on Power Over Ethernet (POE) Technology," Process Automation Instrumentation, Jan. 2005, vol. 26, No. 1, p. 5-8. Abstract Only.

Communication from European patent application No. 06 773 602.5, dated Jun. 6, 2008.
Third Official Action for Russian patent application No. 2008106473, dated Jan. 18, 2010.
Summons to attend oral proceedings for European patent application No. 06788153.2, dated Dec. 8, 2009.

Rejection Decision issued by the Chinese Patent Office for Chinese patent application No. 200680025970.0, dated Feb. 5, 2010.
Third Examination Opinion for Chinese patent application No. 200580026507.8 dated May 28, 2010.

* cited by examiner

INTERFACE MODULE WITH POWER OVER ETHERNET FUNCTION

FIELD OF INVENTION

The present disclosure relates generally to process monitoring and/or control systems, and more particularly, to process control systems and process monitoring systems adapted for Ethernet-based power distribution.

BACKGROUND OF THE INVENTION

Process monitoring and control systems, such as those used in chemical processes, petroleum, or other types of industrial processes, typically include a centralized monitoring and control system communicatively coupled to a workstation of an operator or user and to one or more field devices via analog or digital communication paths. Field devices can be sensors adapted to monitor process parameters (such as temperature, pressure, flow rate, and the like) and/or transducers adapted to perform operations on the industrial process (such as opening and closing valves, and so on).

Generally, the centralized monitoring and control system receives signals indicative of process measurements made by the field devices and/or other information pertaining to the field devices via an input/output (I/O) device or module, which may be analog or digital. Monitoring systems receive signals indicative of process measurements and monitor various aspects of a process based on the received signals. Monitoring systems can be adapted to compare measured process data against pre-determined limits and to initiate an action (such as generating an alarm signal) if the limit is exceeded.

A process controller of a monitoring and control system can use the measurements and other information to monitor a process and to implement a control routine. The process controller can generate control signals, which can be sent over buses or other communication paths or channels via an analog or digital I/O device to the field devices to control the operation of a particular process.

Conventionally, various communication protocols were developed to enable controllers and field devices from different manufacturers to exchange data. One such communication protocol is a MODBUS protocol, for example. The MODBUS protocol defines a message structure that controllers can recognize and use regardless of the types of networks over which they communicate. The MODBUS protocol is well known in the art and is described in detail in numerous articles, brochures, and specifications that are readily available from various sources including manufacturers of devices that utilize the MODBUS protocol. Other communication protocols include, for example, HART®, PROFIBUS®, actuator sensor interface ("AS-Interface"), WORLDFIP®, Device-Net®, CAN, and FOUNDATION™ FIELDBUS™ (hereinafter "fieldbus") protocols.

Regardless of the communications protocol used, power delivery to individual field devices and to interface modules and junctions within process monitoring and control networks impose costs. In particular, cabling itself and the cost of cable installation increase the overall costs of such systems. Moreover, when adding new devices to network, stringing additional cables to deliver power and signals to the new devices adds to the costs, complexity, and installation time.

Recently, a new standard has emerged (IEEE 802.3af) relating to power delivery to distributed systems. Specifically, the standard involves delivering power over existing Ethernet cabling utilizing unused pairs (or signaling pairs) of wires within the cabling. This delivery of electrical power over Ethernet cables is referred to as "Power over Ethernet" (PoE). The IEEE standard allows for 48-volts and 350 mA to be delivered over the same Ethernet cabling (typically CAT5E cabling) as the Ethernet communications.

Therefore, there is ongoing need for industrial process devices that can take advantage of emerging power delivery techniques and existing cabling for coupling new field devices to process monitoring and control systems.

SUMMARY

An interface module for use in a process control or monitoring system has an Ethernet port, a controller, and at least one segment I/O module. The Ethernet port is adapted to send and receive signals in an Ethernet protocol over a cable comprising a plurality of wires and to receive a voltage potential from at least one pair of the plurality of wires. The controller is coupled to the Ethernet port and powered from the received voltage potential. The at least one segment I/O module is coupled to the controller and is adapted to couple to an associated field device segment with at least one attached field device. The at least one segment I/O module is adapted to interact with the at least one attached field device on the associated field device segment.

DETAILED DESCRIPTION

Figure 1:
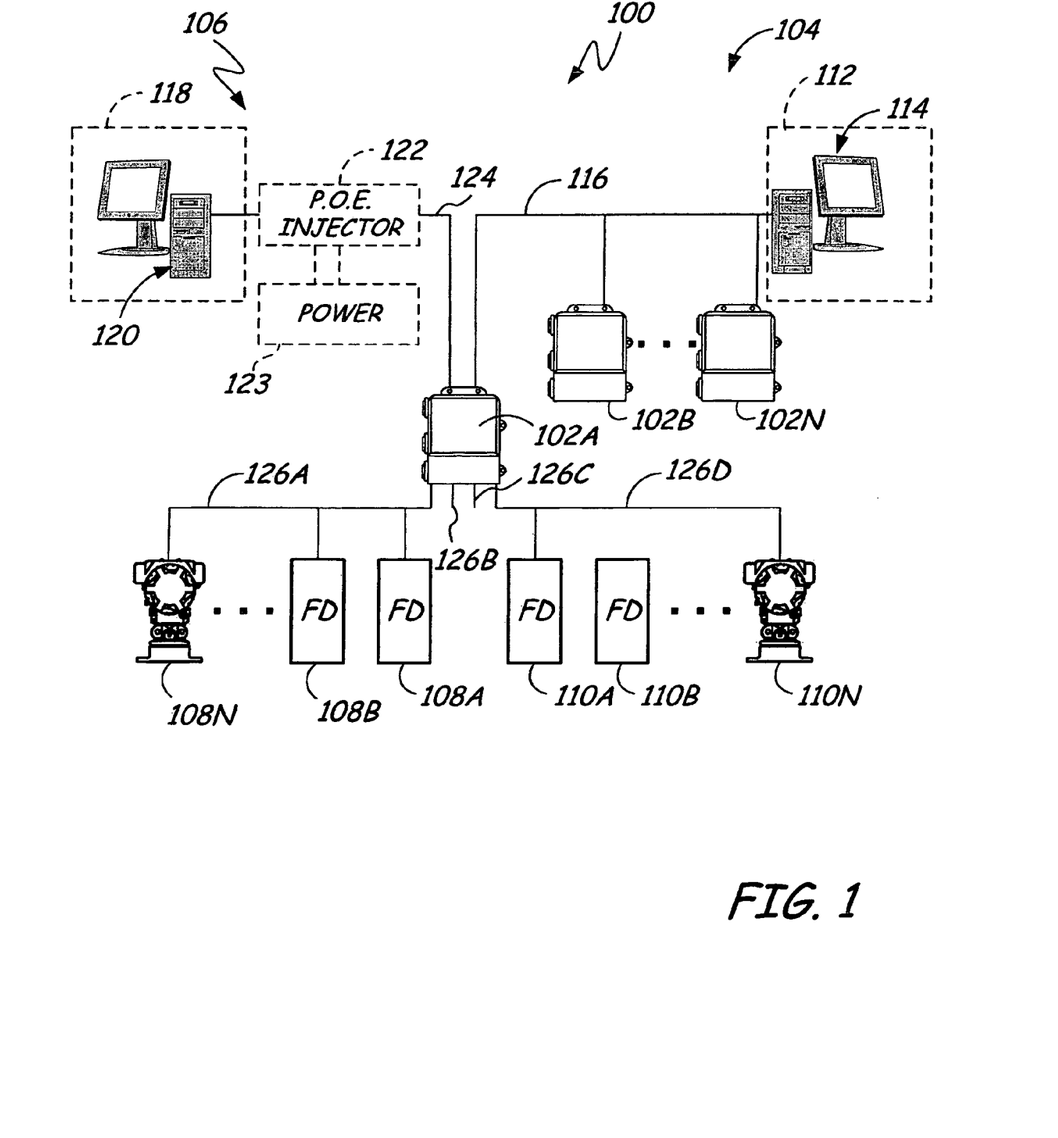
FIG. 1 is a simplified block diagram of a Power over Ethernet enabled interface module according to an embodiment of the present invention.

FIG. 1 illustrates a simplified block diagram of a process control or monitoring system 100 having an interface module 102A adapted to couple one or more networks 104 and 106 to a plurality of field devices 108A-110N, where any number of field devices can be used.

Network 104 is comprised of a system 112 with an operator interface 114 (such as a workstation or computer), which can be coupled to the one or more interface modules 102A-102N via cabling 116. Communications between the system 112 and the interface modules 102A-102N can be in any communication protocol, including, for example, MODBUS, PROFIBUS®, AS-Interface, WORLDFIP®, Device-Net®, CAN, and FIELDBUS protocols.

Process network 106 is comprised of a control or monitoring system 118 with an operator interface 120 (such as a user workstation or computer), which can be coupled through a Power over Ethernet injector (POE injector) 122 via Ethernet cabling 124 to one or more of the interface modules 102A-102N. The POE injector 122 receives power from power supply 123 and places a voltage potential on at least one unused pair of wires within the Ethernet cabling 124. Alternatively, the POE injector 122 can place a voltage potential on the same pairs of wires that carry the Ethernet signal.

The interface modules 102A-102N can be adapted to communicate with one or more networks, such as networks 104 and 106. Additionally, each interface module 102A-102N is preferably adapted to derive operating power from the voltage potential on the Ethernet cabling 124. Power can be delivered on the same cable 124 as Ethernet communications. The Ethernet cabling 124 can be, for example, a CAT5E cable. Additionally, each interface module is preferably adapted to deliver power to one or more field device segments 126A-126D to power each of the field devices, such as field devices (FD) 108A-108N and 110A-110N.

In one embodiment, a 24-volt power supply can be used to power the interface module 102A and up to four Fieldbus segments 126A-126D, for example. The interface module 102A, in this embodiment, is adapted to communicate with control or monitoring center 118 via Ethernet cabling 124, to derive power from voltage potential on the Ethernet cabling 124, and to provide Fieldbus power conditioning to each of the Fieldbus segments 126A-126D. The interface module 102A allows for each installation and connection to field devices.

The Power over Ethernet standard (IEEE 802.3af) allows up to 48-volts and up to 350 mA to be carried by the Ethernet cabling 124. Depending on the power architecture, cable lengths, field device power requirements, intrinsic safety requirements, and the like, the POE standard makes it possible to operate the interface module 102A, a power conditioner, and some field devices or field device segments. For example, the model 848 Temperature module (848T) (produced by Rosemount Inc. of Eden Prairie, Minnesota) can be used as field devices 108A-108N on the field device segment 126A. Four 848T temperature modules require about 100 mA of current (combined), but together provide 32 temperature monitoring points. Assuming the Ethernet cabling 124 carries 48-volts and 350 mA of current, this leaves 250 mA for the interface module. With lower power field devices, the number of field devices can be increased while still leaving sufficient power for the interface module. Thus, a large number of process variables can be delivered down the same cable assembly as the power supply.

By delivering power through the Ethernet cable 124, one cable pair (e.g. power cabling) can be eliminated, and installation can be made simpler. In many installations, Ethernet ports and cabling may already be in place, allowing for easy installation. With lower powered field devices, the capabilities of the interface module are even greater, allowing for power delivery to more field devices and longer segments. Additionally, newer PoE standards, in the near future, may allow for higher voltage and/or higher current delivery, thereby allowing for power delivery to more segments or networks and more field devices.

In general, by utilizing Ethernet-type communications protocols, control and/or monitoring functions can be accessed, for example, via a hypertext markup language (web-page) interface, using a standard Internet browser. In this instance, the interface modules 102 are accessible by any addressing means, including Transmission Control Protocol/Internet Protocol (TCP/IP) addressing, Medium Access Control (MAC) addressing, Network Layer addressing, or any other electronic addressing means supported by an Internet browser, for example. The interface module 102A, for example, can be programmed with web server software, and can be provided with unique network address. Configuration of the interface module 102A can be achieved over the Ethernet cabling 124 using, for example, web browser software available in any personal computer, such as operator interface 120.

A MAC address, for example, traditionally is in the form of a 48-bit number (or 64-bit number), which is unique to each Local Area Network (LAN) Network Interface Card (NIC). The MAC address comprises two distinct identifiers (IDs). The first identifier is a unique 24-bit manufacturer ID, and the second identifier is a 24-bit (or 40-bit) extension ID (or Board ID), which is assigned by the manufacturer. The Board ID identifies the specific NIC, which is specific to the device. In a LAN packet transmitted over the network, the destination and source MAC names are contained in the header and are used by network devices to filter and forward packets.

Ethernet packets are variable length units in which information can be transmitted over an Ethernet network. Each Ethernet packet includes a synchronization preamble, a destination address (TCP/IP, MAC, Network Layer and so on), a source address, a field containing a type-code indicator, a data field that varies from 46 to 1500 bytes, and a cyclical redundancy check that provides a statistically derived value for confirming data accuracy. In one embodiment, the destination address is a device specific address corresponding to a particular interface module 102. In an alternative embodiment, the data field contains an address specific to the particular interface module 102.

Regardless of the addressing protocol used, the interface modules 102 are adapted to transmit and receive information in packets over the same Ethernet cabling 124 from which they derive power. The control signals, measurement signals, and so on, can be packetized into the data field of an Ethernet frame, for example, for transmission over the network.

Figure 2:
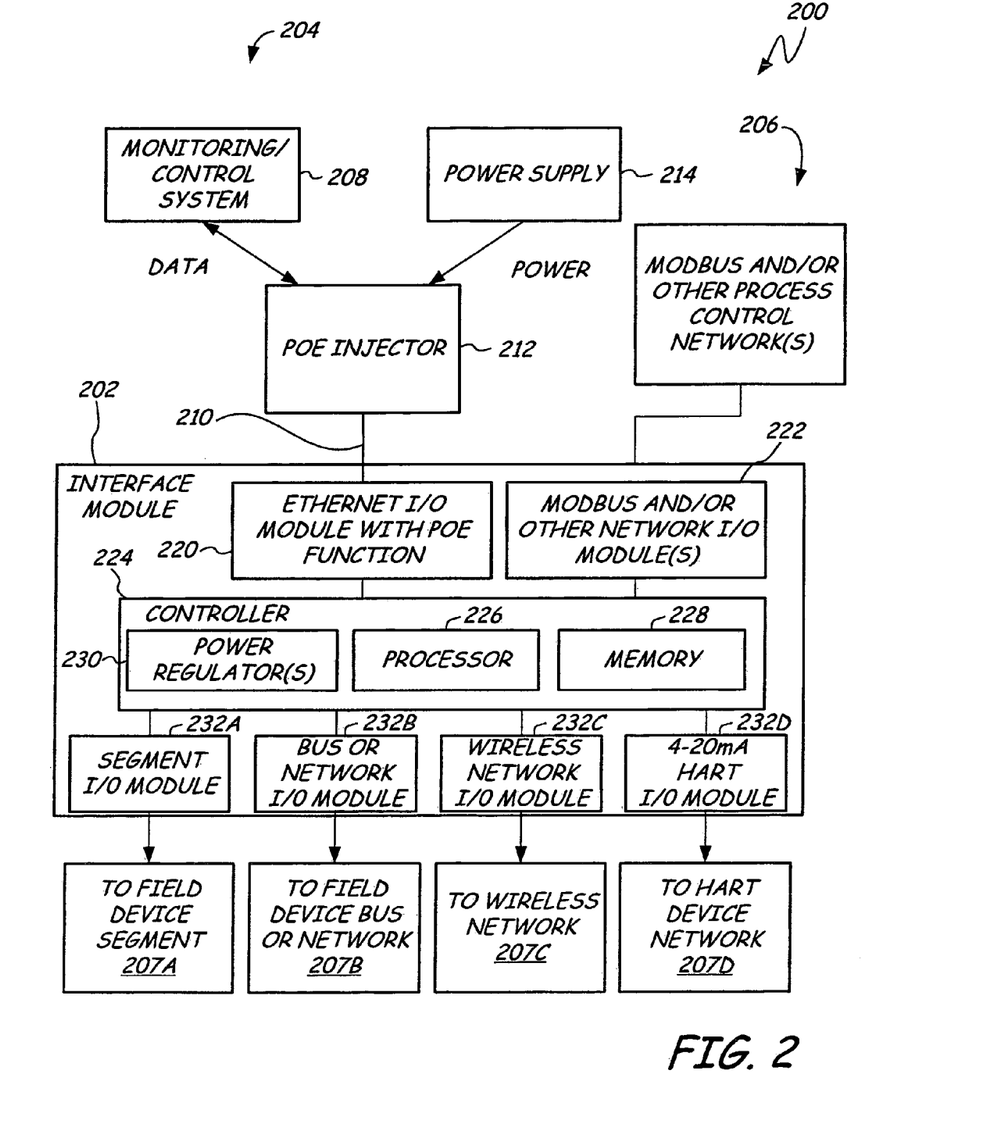
FIG. 2 is an expanded block diagram of an interface module adapted for Power over Ethernet and for communication between various network protocols according to an embodiment of the present invention.

FIG. 2 illustrates an expanded block diagram of an interface module within a process monitoring and control system 200 according to an embodiment of the present invention. The monitoring and control system 200 includes an interface module 202 coupled between monitoring and control networks 204 and 206 and a plurality of process monitoring and control devices coupled via networks, buses or segments, such as a FOUNDATION FieldBus segment 207A, a field device bus or network 207B, a wireless network 207C (with field devices adapted to communicate wirelessly), and a HART® device network 207D. Monitoring and control network 204 is comprised of a monitoring and control system 208 coupled to the interface module 202 via an Ethernet connection 210. The monitoring and control system 208 can be implemented as a server running data acquisition software, which can be accessed by process monitoring and control systems.

A POE injector 212 coupled to a power supply 214 is positioned between the interface module 202 and the monitoring and control system 208 to drive a voltage potential onto wires in the Ethernet cabling 210. Since the power requirements of the interface module 202 and of the downstream field devices are known, the POE injector 212 can drive an appropriate voltage potential onto the cabling 210, for example, up to the parameters defined by the IEEE 802.3af PoE standard.

Generally, the interface module 202 is adapted to provide bi-directional data transmissions between the plurality of field device buses 207A-207D and the one or more control networks 204 and 206. The interface module 202 generally includes an Ethernet Input/output (I/O) module (or Ethernet interface) 220 and optionally one or more network I/O modules (or other network interfaces) 222 adapted to communicate with the control networks 204 and 206. Controller 224 can include a processor 226, a memory 228 and one or more power regulators 230. The controller 224 is coupled to a plurality of I/O modules 232A-232D for delivering power to and communicating with a plurality of field devices. For example, I/O module 232A can be a segment I/O module adapted to communicate with a field device segments 207A. Module 232B can be a bus or network I/O module for communicating with a field device bus or network 207B. Module 232C can be a wireless transceiver adapted to communicate via a wireless network 207C with one or more field devices adapted to communicate wirelessly. Module 232D can be a 4-20 mA HART® I/O module coupled to a HART® network 207D to which field devices are coupled.

Generally, the controller 224 is adapted to perform primary functions on the industrial process through various field devices. The controller 224 via processor 226 can process stored data pertaining to one or more of the field devices (to condition the information for use by the control system 208) and/or to compare measurements against stored reference data from memory 228. The controller 224 can communicate with the control system 208 via the Ethernet cable 210 and/or with other interface modules (such as elements 102A-102N in FIG. 1) in a digital or combined digital-analog format. Additionally, each field device and/or the interface module 202 can be adapted to perform secondary functions, such as calibration, identification, diagnostics and the like.

The controller 224 is adapted to process information and control signals received from I/O modules 220 and 222, to direct a signal and conditioned power to the appropriate field device(s) via one or more of the field device segments 207A-207D through selected segment I/O module(s) 232.

The controller 224 may include one or more power regulators 230, which condition power for the field device segments 207A-207D. In one embodiment, a separate power regulator 230 is provided for each field device segment. In an alternative embodiment, a single power regulator 230 is adapted to deliver power to all of the associated field device segments 207A-207D. Each of the one or more power regulators 230 can be adapted to clamp or limit voltage and current levels to the field device segments 207A-207D to prevent sparking or capacitive-type discharge of voltage potential, particularly for intrinsic safety reasons.

Figure 3:
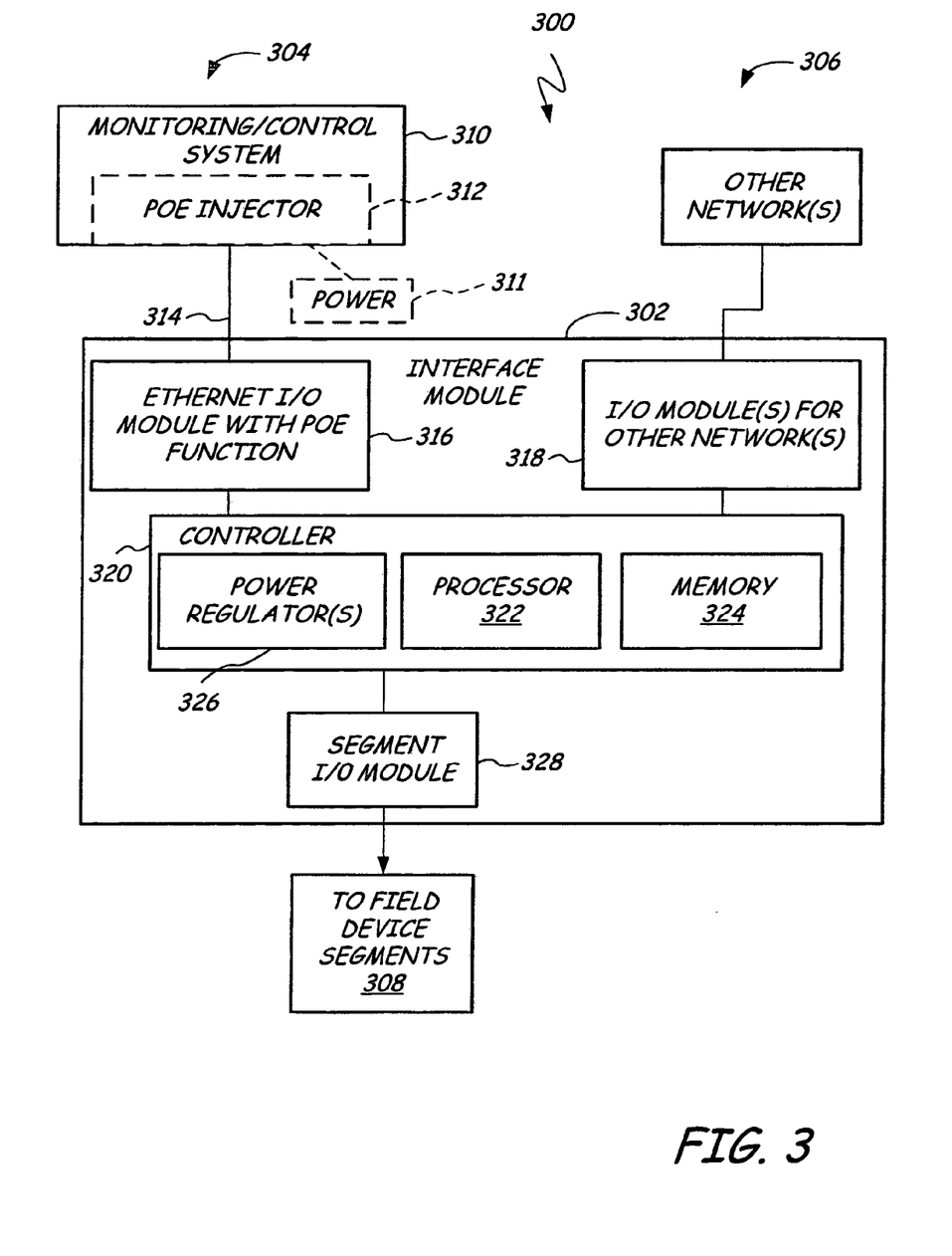
FIG. 3 is an expanded block diagram of an industrial process control and monitoring system adapted for Power over Ethernet according to an embodiment of the present invention.

FIG. 3 illustrates an alternative embodiment of a process control system 300 including an interface module 302 coupled between control networks 304 and 306 and a plurality of field device segments 308. Control network 304 includes a control system 310 with an operator interface (shown in FIG. 1 as element 120). The control system 310 includes a POE injector 312, which is integrated into the control system 310. The control system 310 is coupled to the interface module 302 through the POE injector 312 via Ethernet cabling 314. The POE injector 312 places a voltage potential on wires within the Ethernet cable 314. Control network(s) 306 can include MODBUS or any other control network. The Ethernet control network 304 is coupled to the interface module 302 via an Ethernet I/O module with POE function 316, and the other networks 306 are coupled to the interface module 302 via I/O module(s) for other network(s) 318.

The interface module 302 includes the Ethernet I/O module with POE function 316 and the I/O module(s) for other network(s) 318, which are coupled to controller 320. The controller 320 includes a processor 322, a memory 324, and power regulator(s) 326. The controller 320 is coupled to segment I/O module 328 for sending and receiving information to and from field devices on the field device segments 308.

Figure 4:
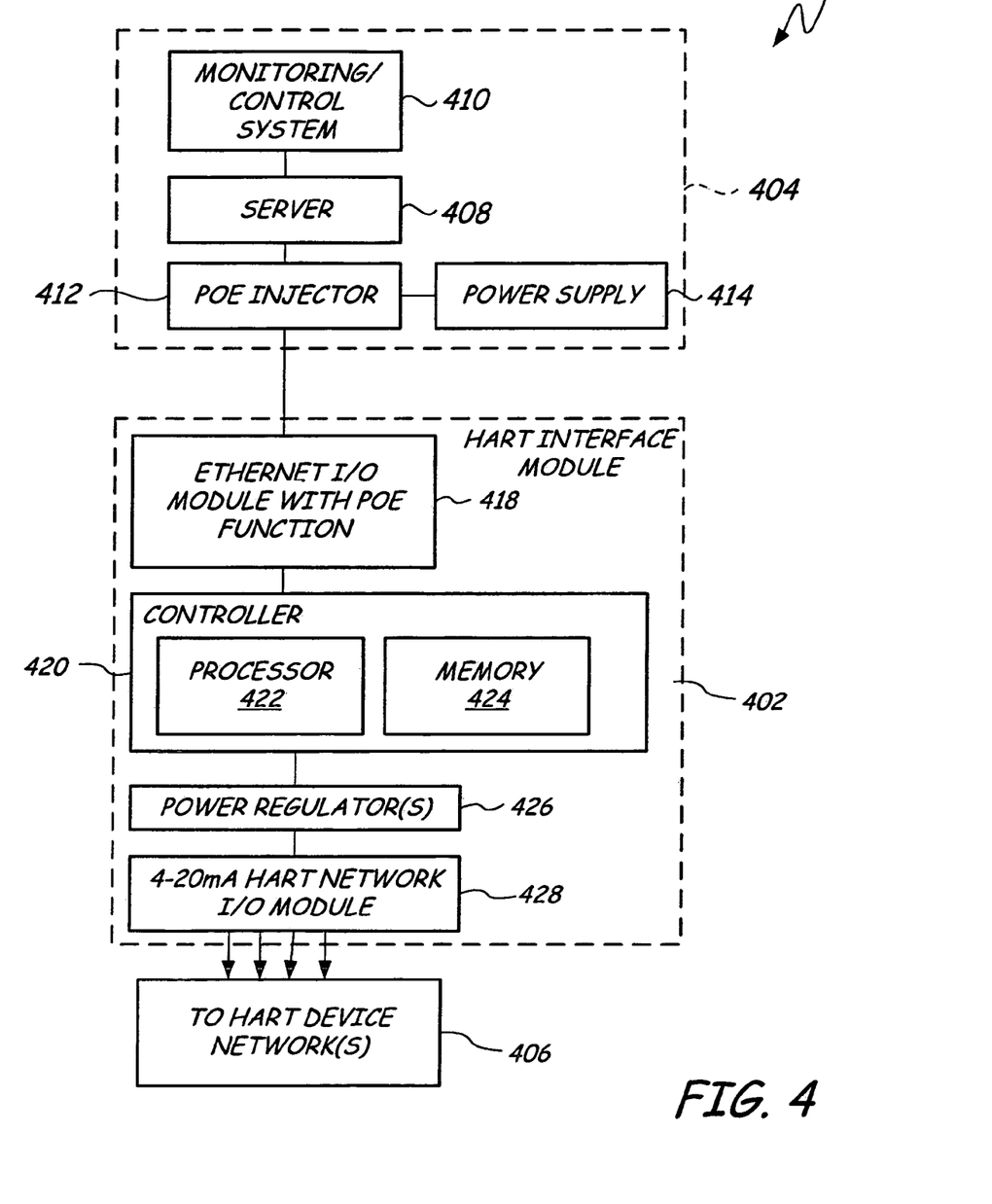
FIG. 4 is a simplified block diagram of an interface module adapted for power delivery to a HART network via Ethernet cabling according to an embodiment of the present invention.

FIG. 4 illustrates a simplified block diagram of a monitoring and control system 400 according to an embodiment of the present invention. The monitoring and control system 400 includes an HART® Interface Module (402) adapted to couple a monitoring and control network 404 to a HART® device network 406. The monitoring and control network 404 has a server 408 running data acquisition software, a process monitoring and control system 410 coupled to the server 408, and optionally a POE injector 412 with a power supply 414 for driving a voltage potential onto an Ethernet cable 416.

The HART® Interface Module 402 is coupled to the Ethernet cable 416 by an Ethernet I/O module with PoE function 418. The Ethernet I/O module with PoE function 418 is coupled to controller 420 within the HART® Interface Module 402. The controller 420 can be comprised of a processor 422 and a memory 424 within which functional instructions for the controller 420 can be stored. One or more power regulators 426 are adapted to drive an appropriate voltage through a 4-20 mA HART® Network I/O module 428 onto one or more HART® device networks 406. The 4-20 mA HART® Network I/O module 428 is adapted to transmit both power and signals to the HART® device network(s) 406 and to receive signals from HART® devices attached to the HART® device network 406. In general, the HART® Interface Module 402 is adapted to relay signals in both directions between the Ethernet monitoring and control network 404 and the Hart device network(s) 406.

The 350 mA and 48V power values of the IEEE 802.3af POE standard can readily support a HART® multiplex application (with 4-20 mA devices) with Ethernet communication output. HART® is typically present in 4-20 mA loops or multi-drop segments, allowing for the POE to power not only the loops or segments, but the Ethernet interface as well. In a HART® embodiment, 4-20 mA /HART® device networks 406 can be multi-drop HART® protocol segments, and the interface module 402 can be adapted to derive power from the Ethernet cabling 416 and to deliver power to multiple 4-20 mA HART® devices, for example. With lower power devices or higher voltage and/or current PoE capacities, the interface module 402 can provide power to more and more 4-20 mA HART® devices and/or HART® device networks.

It should be understood by workers skilled in the art that the POE function described above can be implemented without incorporating I/O modules for other types of network connections, such as where the entire process control system is implemented on an Ethernet network. Additionally, it should be understood that the field device segment can utilize any data communication format adapted for use with the industrial process. In one embodiment, the field device segment utilizes a communication protocol such as HART®, Fieldbus, and the like. In another embodiment, the field device segment utilizes an Ethernet communications protocol with specialized couplings to adapt the Ethernet cabling for harsh conditions of the industrial process environment. Such couplings and Ethernet cable shielding can also be adapted to prevent sparking for intrinsic safety reasons.

Although the present invention has been described with reference to preferred embodiments, workers skilled in the art will recognize that changes may be made in form and detail without departing from the spirit and scope of the invention.

What is claimed is:

1. An interface module for use in a process monitoring or control system comprising:
    an Ethernet port adapted to send and receive signals in an Ethernet protocol over a cable comprising a plurality of wires, the Ethernet port adapted to receive a voltage potential from at least one pair of the plurality of wires;
    a controller coupled to the Ethernet port and powered from the received voltage potential; and
    at least one wireless segment I/O module coupled to the controller and adapted to wirelessly couple to at least one wireless field device, the at least one wireless segment I/O module being adapted to interact with the at least one wireless field device.

2. The interface module of claim 1 wherein the interface module sends and receives information to and from a monitoring or control center via the Ethernet port.

3. The interface module of claim 1 further comprising:
    one or more network I/O ports adapted to send and to receive data from one or more networks having different communications protocols.

4. The interface module of claim 3 wherein the controller is adapted to send information from one or more wireless field devices to a control center over the one or more networks according to a signal protocol appropriate for each of the one or more networks.

* * * * *